United States Patent [19]

Ray

[11] Patent Number: 5,636,113

[45] Date of Patent: Jun. 3, 1997

[54] SATURABLE REACTOR

[75] Inventor: Glen Ray, Big Bend, Wis.

[73] Assignee: Allen-Bradley Company, Inc., Milwaukee, Wis.

[21] Appl. No.: 414,818

[22] Filed: Mar. 31, 1995

[51] Int. Cl.$^6$ ........................................ H01F 3/10
[52] U.S. Cl. ........................................ 363/54
[58] Field of Search ........................ 219/108–110; 335/296, 297; 336/212, 233; 363/54

[56] References Cited

U.S. PATENT DOCUMENTS 4,709,132  11/1987  Tengler et al. .................. 219/110
4,739,294  4/1988  van Mensvoort et al. .......... 335/297

*Primary Examiner*—Aditya Krishnan
*Attorney, Agent, or Firm*—John M. Miller; John J. Horn

[57] ABSTRACT

A "figure 8" shaped saturable reactor including a central leg, two lateral legs, an upper bar connecting the upper ends of each leg, a lower bar connecting the lower ends of each leg, and a coil wrapped around the central leg, the cross-sectional area of the central leg at its narrowest point being less than the cross-sectional areas of the two lateral legs combined so that the central leg saturates prior to the lateral legs saturating.

11 Claims, 4 Drawing Sheets

SATURABLE REACTOR

FIELD OF THE INVENTION

The present invention relates to systems for controlling electric motors and, more particularly to a saturable reactor that limits reverse recovery current in semiconductor switching elements of a voltage controller.

DESCRIPTION OF THE ART

Semiconductor switching devices such as thyristors or semiconductor controlled rectifiers (SCRs) are used in many industries to control currents and voltages in electrical systems. A thyristor is typically a three-electrode semiconductor device having an anode, a cathode, and a control or gate terminal. When a thyristor anode and cathode are externally connected in series with a source of forward anode voltage so that the anode potential is positive with respect to the cathode, a thyristor will ordinarily block appreciable load current until a firing or trigger signal is applied to the control terminal, where upon the thyristor switches from its blocking or "off" state to a conducting or "on" state in which the ohmic value of the anode-to-cathode resistance is very low.

Once a thyristor is turned on, it can be turned off only by reducing its current below a given "holding" level and applying a reverse voltage across the anode and cathode for a time period sufficient to allow the thyristor to regain its forward blocking ability. Such a turn off method is referred to as commutation.

In certain applications multiple switch configurations can be designed wherein commutation of one switch is affected by another. For example, in a three phase six pulse AC-DC converter a set of six semiconductor switches operate together to turn AC voltage into DC voltage. The switching sequence drives the switches so that one switch which is turning off is commutated off by another switch that is turning on. The operation of the switches and the switching sequence is well known in the art.

While semiconductor switches are extremely useful and effective in circuits such as AC-DC converters, they are susceptible to damage or destruction if not protected from unintended current or voltage surges. One particularly damaging type of current surge in semiconductor devices is referred to as reverse recovery current. Referring to FIG. 1, while a semiconductor switch is commutating off, the current through the device decreases at a rate di/dt toward zero current as indicated by the solid line 7. As the current approaches zero, however, the switch is unable to withstand the commutating reverse voltage and cannot block reverse current until a recombination phenomenon takes place in its PN junction. This results in a brief period of reverse recovery current $I_{rr}$ that eventually decays to zero. If the reverse recovery current $I_{rr}$ exceeds a safe maximum magnitude or peak, it can damage or destroy the semiconductor switch.

The rate of change of current during commutation is a function of circuit parameters and, more specifically, of applied voltage and the total inductance of the switch and other elements in series therewith. Di/dt is related to applied voltage and series inductance according to the following formula:

$$di/dt = -E/L \tag{1}$$

where E represents the magnitude of the applied voltage and L represent the total series inductance.

In addition to reverse recovery current, a quick voltage spike across a switch can also damage or destroy the switch. This is true even where the voltage spike does not surpass the steady state maximum voltage value of a switch. Where a voltage is provided across a semiconductor switch, usually a portion of the switch (i.e. an island at a PN junction) turns on initially. The "turned on" condition spreads across the remaining portions of the PN junction in time. This phenomenon is often referred to as a plasma spreading effect. Where a quick voltage spike is generated across the switch, as an island of the switch is turned on, current rushes through the island. The rushing current can surpass a safe maximum local PN junction current and burnout the switch.

In circuits such as the AC-DC converter described above, when one switch turns on and commutates another switch off, the recently turned on switch often experiences a quick voltage spike. Hence, three phase six pulse AC-DC converters are characterized by both reverse recovery current and voltage spike problems.

To limit peak reverse recovery voltage, it is common practice to provide a series resistor capacitor circuit known as a snubber in shunt with each switch. Snubber circuits alone, however, do not typically provide sufficient protection for the switches.

Another way to limit both peak reverse recovery current and ensure smooth plasma spreading across the PN junction is by providing a saturable reactor in series with each switch. A saturable reactor typically includes an iron core and a coil. The core is usually either toroidally shaped or "figure 8" shaped, having three parallel legs connected at upper and lower ends by upper and lower cross bars respectively. The coil includes a conductor that is wound around a portion of the core, one end forming an input lead and the other forming an output lead. Where the core is "figure 8" shaped, the coil is usually wrapped around the central leg.

A saturable reactor is positioned in series with a voltage source and a switch, the coil being connected in series with the switch so that current through the switch must also pass through the coil.

When current initially passes through the coil, the current induces a magnetic field around the coil which in turn produces magnetic flux in the core. During the initial moments of current flow through the coil, the coil and core magnetically interact to impede current flow as the magnetic flux in the core rises. Hence, the reactor in effect places a high impedance in the line during this initial period. This high impedance limits di/dt during turn-on periods allowing plasma spreading to limit local heating. However, once the current reaches a certain saturating level, the core of the reactor becomes saturated and the magnetic flux therein cannot be increased further. At this point the reactor is characterized by a relatively low inductance and no longer impedes current flow. The reactor maintains its low impedance until the switch is turned off and current therethrough approaches zero.

When a switch is turning off, the current through the switch begins to drop at the rate of di/dt. As the current approaches zero the reactor comes out of saturation. At this point the reactor again places a large inductance in the line in series with the switch. Referring to Equation 1 and FIG. 1, as the inductance L increases, the slope di/dt becomes less steep as indicated by the dashed line di/dt' and the reverse recovery current is limited to $I_{rr'}$.

By combining both a snubber circuit in shunt and a saturable reactor in series with a semiconductor switch, the switch can typically be protected. Nevertheless, saturable reactors introduce some problems into control systems.

One problem with saturable reactors is that they often waste energy. For example, when a reactor core becomes saturated, iron losses within the saturated portion of the core increase and the core operates as an energy sink. In addition, the magnetic field around and in the saturated portions of the core undergoes a phenomenon called magnetostriction where the core actually expands and contracts, thus shaking each time the current through the coil changes. This results in reactor heating caused by iron losses and noise which, in addition to being wasteful, is also bothersome.

Another problem with saturable reactors is that flux, particularly within the saturated portions of the core, "leaks" out of the core and into surrounding air as it attempts to find a suitable flux path. The energy associated with this flux is effectively lost. In addition to being wasteful, stray leakage flux can also cause electrical signal problems where it intersects control circuits for switches or the like.

The industry has attempted to limit iron losses and magnetostriction by using low iron loss cores and other alloys. One example of such an effort is disclosed in Yoshizawa, et al. U.S. Pat. No. 4,769,091. However, these types of solutions have proven to be comparatively costly as the materials required to form the cores are themselves expensive.

Thus, it would be advantageous to have a saturable reactor that conserves energy, is relatively noiseless, and does not produce large amounts of stray leakage voltage.

SUMMARY OF THE INVENTION

The present invention comprises a saturable reactor for reducing reverse recovery current in a semiconductor device. The reactor is positionable in a series circuit with said semiconductor device and a voltage source. The reactor comprises a core which includes at least one central leg, at least two lateral legs disposed on opposites sides of the central leg, and at least two cross bars, an upper cross bar connecting the upper end of each leg and a lower cross bar connecting the lower end of each leg. The central leg has a cross-sectional area that is smaller than the cross-sectional area of the two lateral legs combined. A coil is wrapped around the central leg. When a voltage source supplies current to the circuit through the coil the central leg becomes saturated and at lower current than the two lateral legs combined.

Thus, one object of the present invention is to provide a saturable reactor that can reduce reverse recovery current and protect semiconductor switching devices from high voltage spikes that can damage or destroy a semiconductor device. The saturable reactor of the present invention changes the series inductance of a circuit including a semiconductor switching device so that unintended voltage and current spikes are minimized.

Yet another object of the present invention is to reduce iron losses, leakage flux, and magnetostriction in a saturable reactor by designing the core of the saturable reactor so that a central leg has a reduced cross-sectional area, saturation of the core can be limited to the central leg area which effectively reduces magnetostriction, iron core losses and flux leakage.

Yet another object of the present invention is to limit stray flux leakage that can effect control circuitry. By designing the saturable reactor so that only the central leg of the reactor becomes saturated, any flux leakage that emanates from the central leg can effectively be "captured" by the lateral legs and substantially contained within the area defined by the saturable core.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DETAILED DESCRIPTION OF THE PREFERRED EMBODIMENT

Figure 2:
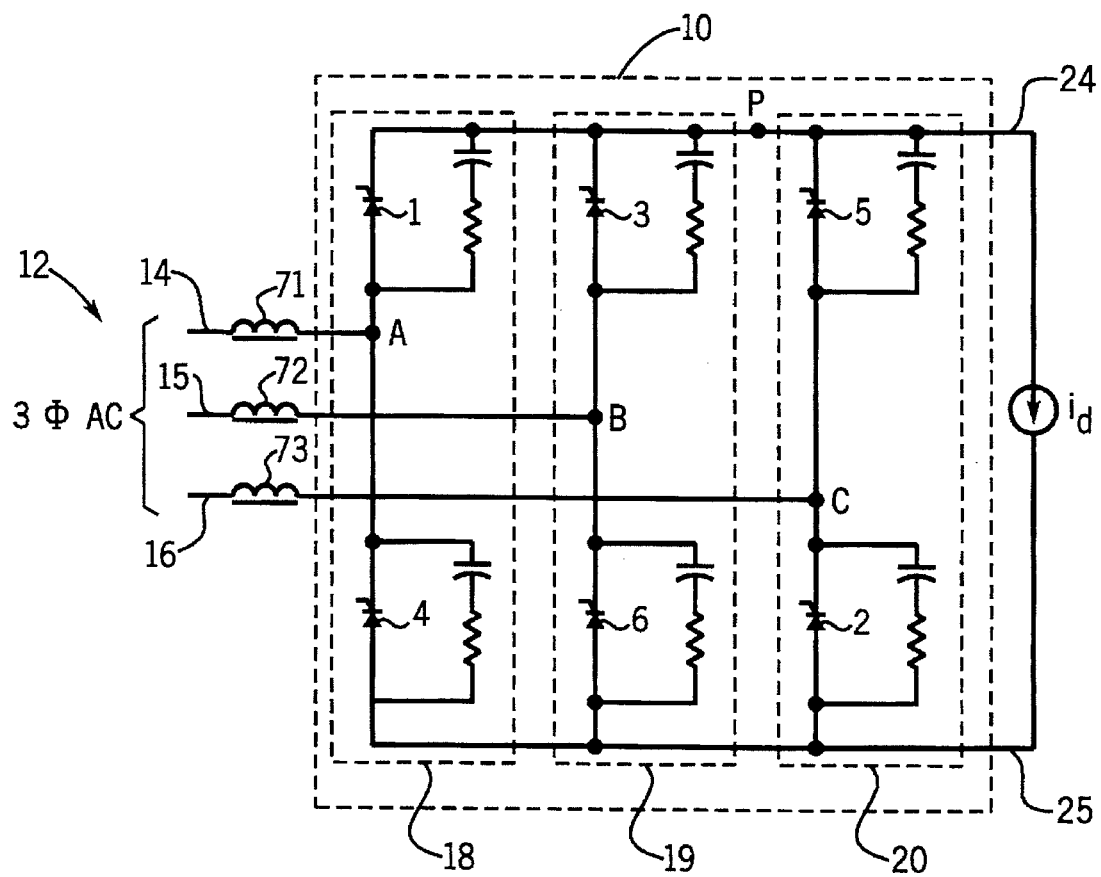
FIG. 2 is a schematic illustrating a three phase six pulse AC-DC convertor.

Referring to FIG. 2, the present invention will be described in the context of an exemplary three phase six pulse AC-DC converter 10. The converter 10 receives three phase AC voltage from a three phase source 12 along supply lines 14, 15, and 16 and produces a DC voltage and direct current $i_d$ that can be provided to a load.

The converter 10 typically includes six thyristor or silicon controlled rectifier (SCR) switches 1–6 grouped in three series pairs 18, 19, 20, the pairs 18, 19, 20 arranged in parallel between positive and negative DC busses 24, 25 respectively.

A separate supply line 14, 16 or 16 is connected to a unique pair of switches 18, 19 or 20, each line 14, 15 or 16 connecting between associated switches 1 and 2, 3 and 4, or 5 and 6 at a central node A, B or C respectively.

In order to turn on a thyristor, a firing pulse must be provided to the control terminal and the device must be forward biased. Hence, converters of this type typically include a signal generator (not shown) that supplies periodic firing pulses to the six thyristors 1–6 in a pattern that fires the switches 1–6 as desired.

Figure 3A:
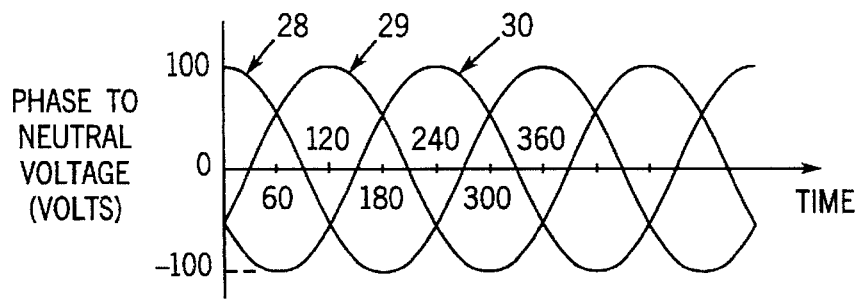
FIGS. 3(a), 3(b) and 3(c) are graphs illustrating phase-to-neutral voltages, phase-to-phase voltages, and a resulting load voltage, respectively, that are related to the AC-DC converter shown in FIG. 2.

Referring also the FIG. 3(a), the three phase AC supply 12 provides an alternating voltage 28, 29 or 30 on each of the three supply lines 14, 15, 16. The voltage 28 on line 14 leads the voltage 29 on line 15 by 120° and the voltage 29 on line 15 lead the voltage 30 on line 16 by 120°.

As well known in the art, the switching sequence of switches 1–6 converts the AC voltages into a DC voltage across DC buses 24, 25. While the controller determines the turn-on times of each switch 1–6, the alternating voltages 28–30 operate together to commutate the switches off at appropriate times. The commutation process can best be understood by way of example.

Figure 3B:
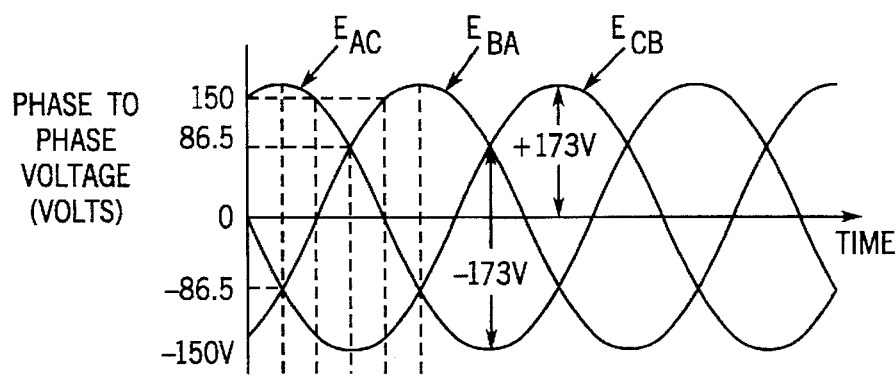
Figure 3C:
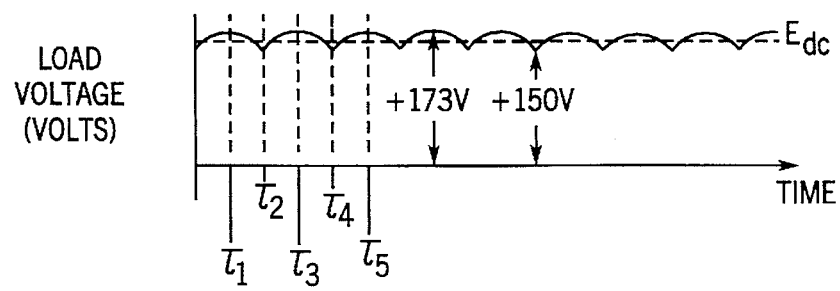

Referring to FIGS. 2, 3(a), 3(b) and 3(c), five points in time $\tau_1$ through $\tau_5$, are indicated. At each point, the value of each line-to-line voltage $E_{AC}$, $E_{BA}$, $E_{CB}$, between nodes A, B, and C is determined from the phase to neutral voltages corresponding the their respective nodes. The maximum amplitude of each phase to neutral voltage 28, 29, 30 is 100 volts and therefore, as seen in FIG. 3(b), the maximum line-to-line voltage is 173 volts (i.e. as well known $V_{LL}=V_{phase}$). FIG. 3(c) shows a DC load voltage generated by a typical AC-DC converter where the maximum phase voltage is 100 volts and the switches 1–6 are always being triggered.

At time $\tau_1$, it can be seen that the values of instantaneous line-to-line voltages are $E_{AB}=E_{max}$ which equals 173 volts, $E_{BA}=E_{CB}$ which equals $-E_{max}$ divided by 2 which equals $-86.5$ volts. Under these circumstances, in FIG. 2, switches 1 and 2 are forward biased due to the 173 volts and act as closed switches. The remaining switches are reverse biased. Because of the closed condition of the first and second switches 1 and 2, the 173 volts is transferred to the load as noted on the output wave form in FIG. 3(c) with the polarity indicated, and current passes down through the load.

As time passes between $\tau_1$ and $\tau_2$, $E_{AC}$ decreases to 150 volts while $E_{BA}$ increases to 0 volts and $E_{CB}$ decreases to $-150$ volts. When evaluating the status of biasing of the switches during this time period, it will be found that switches 1 and 2 continue to conduct and $E_{AC}$ is passed to the output and current flows down through the load.

At time $\tau_2$, a point of transition occurs. With $E_{AC}$ at +150 volts $E_{CB}$ at $-150$ volts, and $E_{BA}$ at 0 volts both the first and third switches 1, 3 conduct for this instant, and the second switch continues to conduct as before. Note, however, that an instant later, $E_{CB}$ becomes greater in magnitude with respect to $E_{AC}$, and switch 1 then becomes reverse biased and switch 3 takes over full conduction. It is at this point, when switch 1 becomes reverse biased by the greater voltage across switch 3, that the reverse voltage is provided across switch 1 resulting in problematic reverse recovery current. It is also at this point, when switch 3 is turned on, that a voltage spike is generated across switch 3 that can result in PN junction burn out as only a portion of the junction is turned on initially. At the exact point of transition $\tau_2$, the voltage across the load is 150 volts as seen in FIG. 3(c), and current flows down through the load.

At $\tau_3$ switches 3 and 2 continue to conduct with $E_{CB}$ at $-173$ volts. Note here that the load voltage is again positive, and current continues to flow down through the load. In effect the voltage passed to the load is not $E_{CB}$ or $-173$ volts. Since the output voltage remains positive, the switching action of the switches actually passes $E_{BC}=+173$ volts to the load (and continues to do so between $\tau_2$ and $\tau_4$).

At time $\tau_4$, another point of transition occurs exactly like that of time $\tau_2$ except that, switch 4 takes over conduction from switch 2, and switch 3 continues to conduct passing +150 volts to the load. Current continues to flow down through the load.

At time $\tau_5$, $E_{BA}$ reaches $E_{max}=+173$ volts while $E_{CB}$ and $E_{AC}$ cross each other at $-86.5$ volts. Switches 3 and 4 continue to conduct, and $E_{BA}=+173$ volts is passed on to the load. Load current continues to flow down through the load.

As the line-to-line voltages of the three phase supply continue to vary with time, the output voltage (FIG. 3(c)) continues to follow the pattern of the first five time segments discussed here with the same results. The load voltage will cycle between $E_{max}+173$ and +150 volts. Hence, the three phase six pulse converter is a forced commutating system which can effectively change three phase AC voltage into DC voltage.

Figure 4:
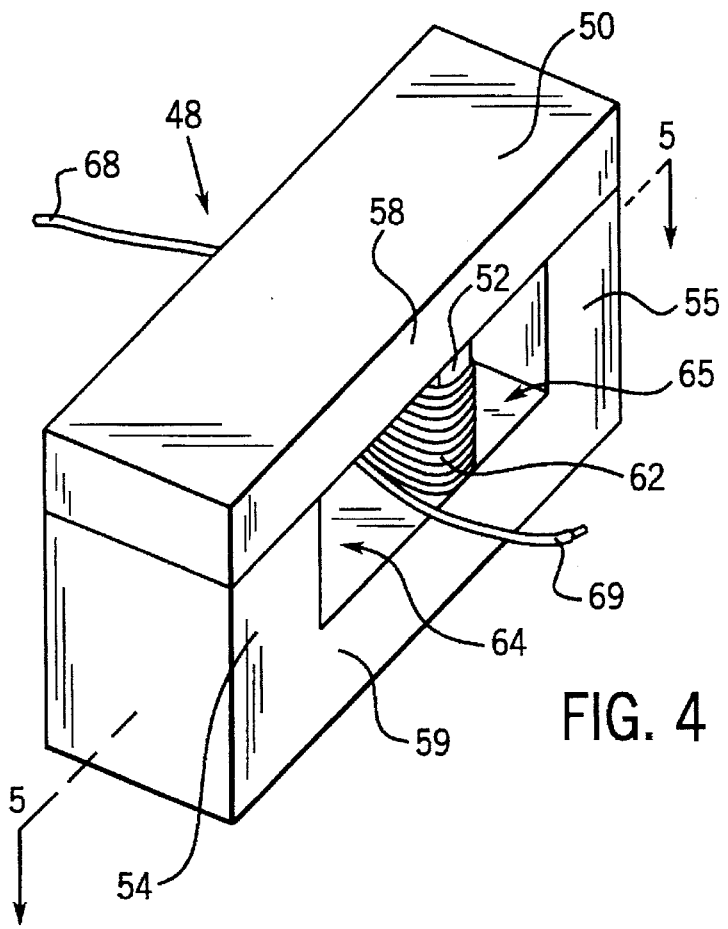
FIG. 4 is a perspective view of a saturable reactor according to the present invention.
Figure 5:
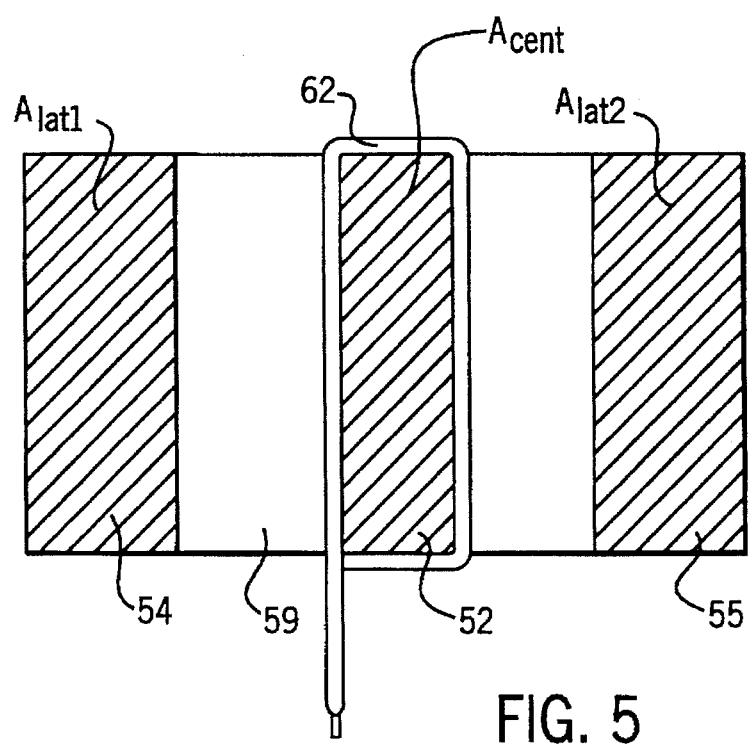
FIG. 5 is a cross-sectional view taken along the line 5—5 of FIG. 4.
Figure 6:
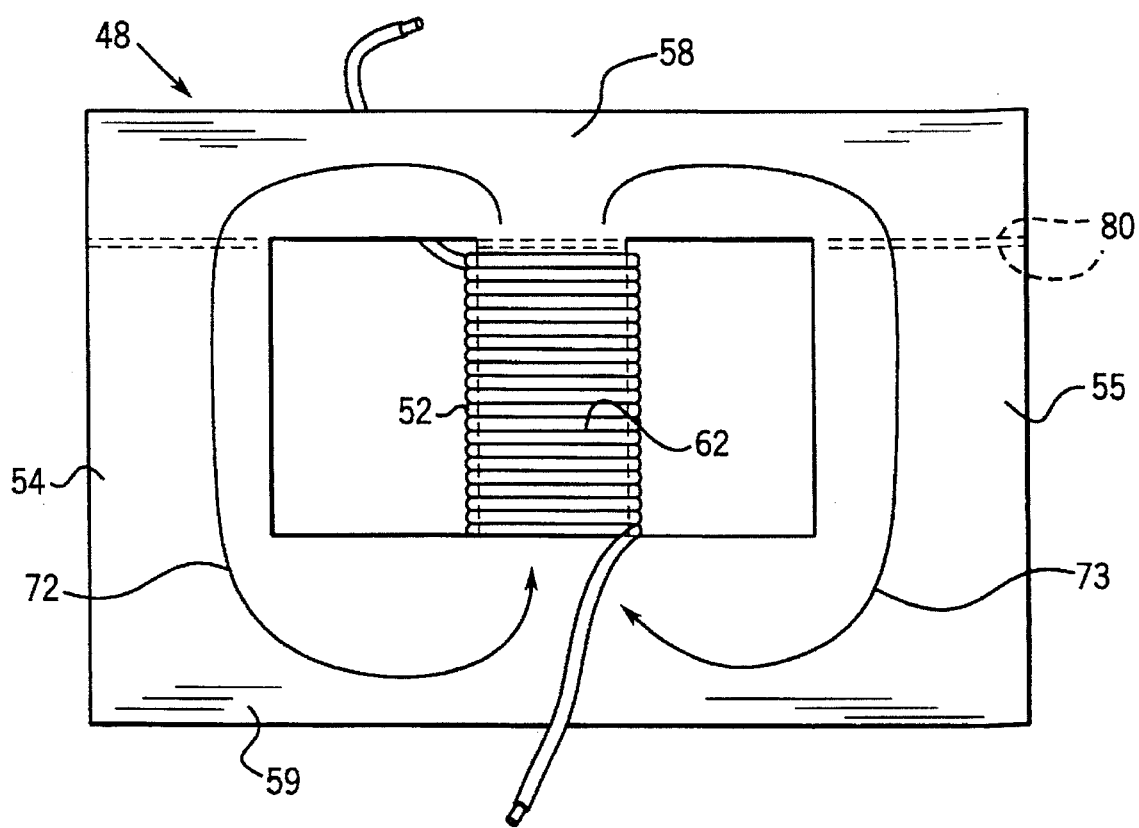
FIG. 6 is a front elevational view of the saturable reactor shown in FIG. 4.

Referring to FIGS. 4, 5, and 6 the present invention includes a saturable reactor 48 having a uniquely designed core portion 50. Preferably, the core 50 is substantially "figure 8" shaped, having a central leg 52, two lateral legs 54, 55 disposed on opposite sides of the central leg 54, and upper and lower cross bars 58, 59, the upper bar 58 connecting the upper ends of each leg together while the lower bar connects the lower ends of each leg. The core 50 is typically formed of iron, but may be formed of any electrically conducting material.

The reactor also includes a conducting coil 62 which is wrapped around the central leg 52, passing through holes 64, 65 formed by the bars 58, 59 and legs 52, 54, 55.

To facilitate easy manufacture, the upper bar 58 may be formed as a separate element. With this design, the coil 62 can be placed on the central leg 52 prior to connecting the upper bar 58 to the other portions of the core 50. An insulation sheath (not shown) is provided around the core 50 to separate the coil 62 from the core 50. This basic design is known.

What is unique about the inventive saturable reactor is that the cross-sectional area A-cent of the of the central leg 52 is less than the cross-sectional areas A-lat1, A-lat2, of both of the lateral legs combined. For the purposes of this invention, it is not important whether areas A-lat1 and A-lat2 are identical, but that their sum is greater than area A-cent. For example, where area A-cent is two square inches, each of areas A-lat1 and A-lat2 might be more than one square inch or area A-lat1 might be 0.5 square inches and area A-lat2 might be two square inches. In addition, the cross-sectional area A-lat1, A-lat2 of each lateral leg may vary if the sum of the narrowest portions in the two lateral legs is greater than the area A-cent. Moreover, the cross-sectional area A-cent may vary if the sum of the narrowest portions of the two lateral legs 54, 55 is greater than the narrowest portion of the central leg 52. In a preferred embodiment, cross-sectional area A-cent is half the area of cross-sectional areas A-lat1 and A-lat2 combined.

Referring to FIG. 2, with a three phase AC-DC converter, three inventive reactors 71, 72, 73 are used to protect the switches 1–6, one reactor positioned in each supply line 14, 15, 16 between the AC source 12 and the converter 10. Referring also to FIG. 4, an input lead 68 is connected to the supply line 14, 15 or 16 on the AC side while an output lead 69 is connected to the line on the DC side.

Referring again to FIG. 2 and specifically to switch 1 and series reactor 71, when switch 1 is opened, no current passes through the switch and hence no current passes through the reactor 71. In this state no magnetic flux exists within the reactor core 50. When switch 1 is closed, a 150 volt spike (see also FIG. 3(c)) is provided across the switch and specifically across its PN junction. At this time, without the reactor 71, one or more islands at the PN junction would turn on and excessive current would flow therethrough which could burn out the switch 1. However, with the reactor 71 in series with the switch 1, current passing through the switch 1 is governed by the reactor 71.

Referring specifically to FIG. 6, as current passes through the coil 62, a magnetic field is generated therearound. The field produces magnetic flux lines that flow through the core 52 as indicated by arrows 72, 73. The core 52 and coil 62 interact as well known in the art to impede excessive current flow until the flux within the core 52 increases to the point of saturation. When saturated, additional current flow through the coil 62 only increases the flux through the core 52 slightly, impedance caused by the reactor becomes relatively minimal, and current flows through the coil 62 relatively freely. By this point, however, the entire PN junction of the switch 1 is turned on and the switch 1 can handle the current supplied by source 12.

Importantly, for the purposes of the present invention, because central leg 52 has a reduced cross-sectional area A-cent, only the central leg 52 is saturated while the other two legs 54, 55 and upper and lower bars 58, 59 remain unsaturated. When the central leg 52 saturates the inductance of the reactor is minimized and current freely flows through the coil 62 and switch 1.

Figure 1:
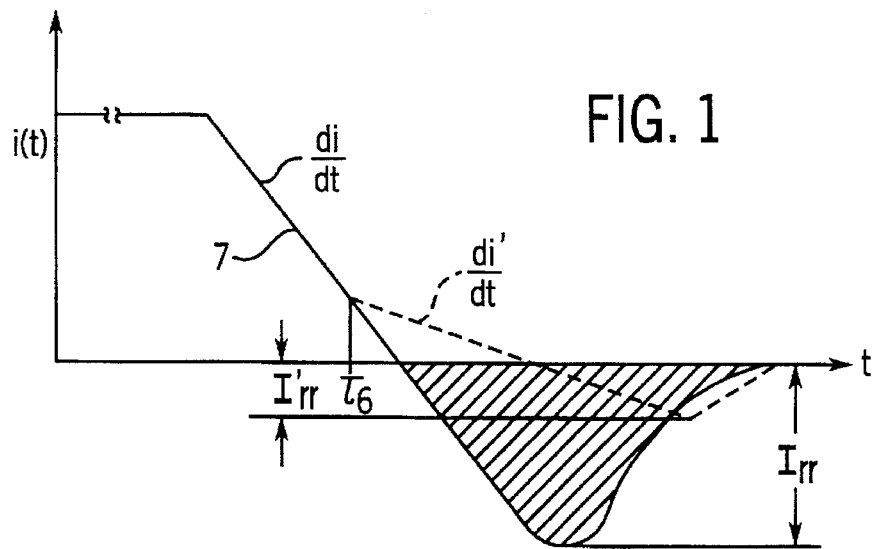
FIG. 1 is a graph of a current waveform during the recovery time of a typical thyristor.

The switch 1 remains closed and conducting and the central leg 52 of the reactor 71 remains saturated until the switch 1 is forced off by switch 3 as described above. When forced off, current through switch 1 decreases at the rate di/dt (see FIG. 1) until time $\tau_6$ at which point the reactor 71 comes out of saturation and provides a large inductance in series with the switch 1. Referring again to Equation 1, as inductance L is increased, the slope of di/dt is altered so that current decreases at the rate of di/dt as it approaches zero. By changing the slope of di/dt the reverse recovery current $I_{rr}$ is reduced to $I'_{rr}$. Hence, it should be appreciated that the present saturable reactor has substantially the same effect on reverse recovery currents and excessive current flow at switch turn on as do other saturable reactors.

However, the present reactor has many advantages over other reactors. For example, because only area A-cent becomes saturated during operation, the present design limits the amount of flux flowing through the core 50 generally to the maximum amount that can flow through area A-cent. In this way, the high leakage flux that characterizes some saturable reactors can be reduced as leakage flux will be limited to the saturated central leg.

In addition to resulting in a more efficient reactor, by reducing stray leakage flux around the reactor, the possibility of stray flux affecting control circuitry used to fire switches is reduced. In addition, because only the central leg 52 produces appreciable leakage flux and the lateral legs 54, 55 are positioned on either side of the central leg 52, much of the leakage flux produced by the central leg 52 is effectively "recaptured" by the lateral legs 54, 55 which further reduces stray leakage flux that could ultimately affect control circuitry.

Another advantage of the present reactor is that high iron losses (e.g. eddy current and hysteresis losses which are well known in the art) are limited to the saturated portion of the core 50. Hence, the overall iron losses are reduced with the present design. Moreover, magnetostriction which produces noise during reactor operation is substantially limited to the saturated central leg 52.

Thus, the present saturable reactor performs the same function as other saturable reactors but does so in a more efficient and less noisy manner.

While this description has been by way of example of how the present invention can be carried out, those with experience in the art will recognize that various details may be modified to design other detailed embodiments, and that many of these embodiments will come within the scope of the invention.

For example, the invention could be used with any circuit including forced commutation of semiconductor devices and should not be limited to use in three phase AC-DC converters. Also, while FIG. 5 shows an embodiment wherein cross-sectional areas A-lat1 and A-lat2 are of the same, clearly, so long as the sum of those areas adds up to an area that is greater than the cross-sectional area A-cent and are capable of capturing leakage flux emanating from the central leg 52, the design would be contemplated by this invention. Moreover, the present invention also contemplates other designs wherein more than two lateral legs are employed that are spaced around the central leg 52. In this type of design, the cross-sectional areas of all the lateral legs combined should be greater than the cross-sectional area of the central leg alone. Furthermore, the present invention contemplates designs where the central leg is of varying cross-sectional areas and the most reduced area of the central leg has a cross-sectional area that is less than the combined cross-sectional areas of all lateral legs combined.

Referring again to FIG. 6, the saturable reactor 48 may advantageously be formed in a configuration known in the art as an E-I configuration, in which the side bars 54 and 55, the central leg 52, and the lower cross bar 59 are integrally formed by building up "E" shaped laminations, and the upper cross bar 58 is similarly formed from "I" shaped laminations. In this construction, the upper cross bar 58 is placed over the lateral legs 52, 54 and 55, and thus may result in an air gap, shown by dashed lines 80, being formed therebetween. The air gap 80 would normally be arbitrarily small, and therefore have negligible effect. However, in a modified form of the invention, the air gap 80 may be intentionally increased, for example by the use of shims or other separating material, in order to control the overall magnetic path in the reactor 48, as is generally known in the art.

Therefore, to apprise the public of the scope of the invention and the embodiments covered by the invention the following claims are made:

I claim:

1. A saturable reactor for reducing reverse recovery current at turn off and limiting di/dt at turn on in a semiconductor switching device, the reactor positionable in a series circuit with said semiconductor device and a voltage source, the reactor comprising:

a core including at least one central leg, at least two lateral legs disposed on opposite sides of the central leg, and at least two cross-bars, an upper cross-bar connecting the upper end of each leg and a lower cross-bar connecting the lower end of each leg, the central leg having a cross-sectional area that is smaller than the cross-sectional areas of the two lateral legs combined; and a coil wrapped around a central leg;

whereby, when the voltage source supplies current to the circuit through the coil, the central leg becomes saturated at a lower current than the two lateral legs combined.

2. The apparatus as recited in claim 1 wherein the central leg has a cross-sectional area that is smaller than the cross-sectional areas of the upper and lower bars combined.

3. The apparatus as recited in claim 2 wherein the cross-sectional areas of the upper and lower bars combined is equal to the cross-sectional areas of the two lateral legs combined.

4. The apparatus as recited in claim 1 wherein the cross-sectional area of one of the lateral legs is greater than the cross-sectional area of the other lateral leg.

5. The apparatus as recited in claim 4 wherein the lateral leg having the lesser cross-sectional area has a cross-sectional area that is less than the cross-sectional area of the central leg.

6. The apparatus as recited in claim 1 wherein the cross-sectional area of each of the lateral legs separately is less than the cross-sectional area of the central leg.

7. The apparatus as recited in claim 1 wherein the cross-sectional areas of the two lateral legs combined are such that, when the voltage source supplies current to the circuit the two lateral legs remain wholly unsaturated.

8. The apparatus as recited in claim 1 wherein the central leg has a varying cross-sectional area and the narrowest portion of the cross-sectional area of the central leg is less than the cross-sectional areas of the two lateral legs combined.

9. The apparatus as recited in claim 1 wherein the lateral legs include more than two lateral legs and the lateral legs and the cross bars include more than two cross bars and the lateral legs and cross bars are equispaced about the central leg.

10. The apparatus as recited in claim 9 wherein the lateral legs include four lateral legs, the upper cross bar includes two upper cross bars, and the lower cross bar includes two lower cross bars, the upper cross bars being positioned perpendicular to each other and intersecting along a central axis of the central leg, and the lower cross bars being positioned perpendicular to each other and intersecting along the central axis of the central leg, two of the lateral legs connected to a first upper cross bar and a first lower cross bar and the other two lateral legs connect to a second upper cross bar and a second lower cross bar, the lateral legs connecting adjacent ends of the upper and lower cross bars.

11. The apparatus as recited in claim 1 wherein a plurality of the series circuits are included in a three phase six pulse AC-DC converter for converting AC voltage into DC voltage.

* * * * *